United States Patent Office 3,329,306
Patented July 4, 1967

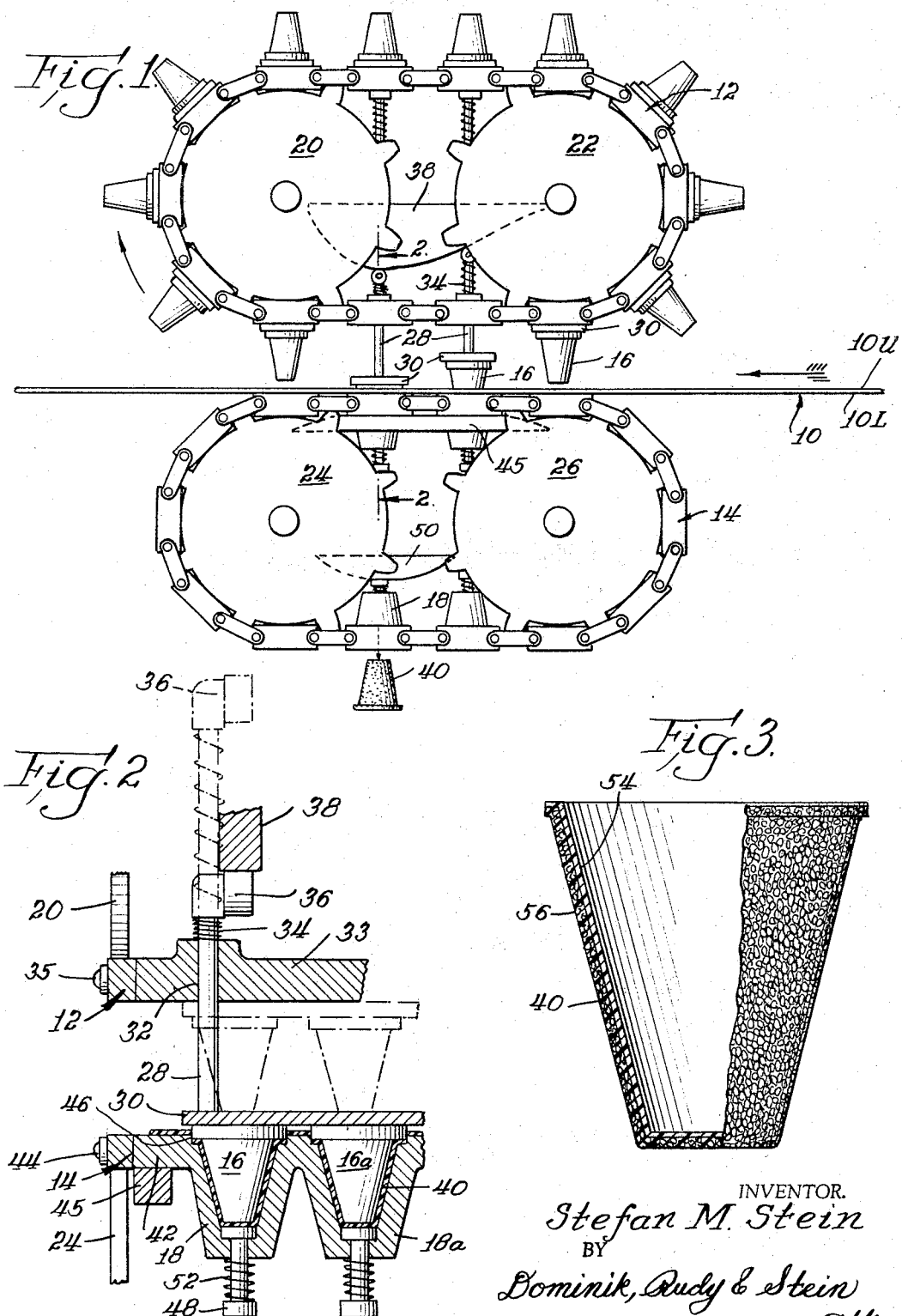

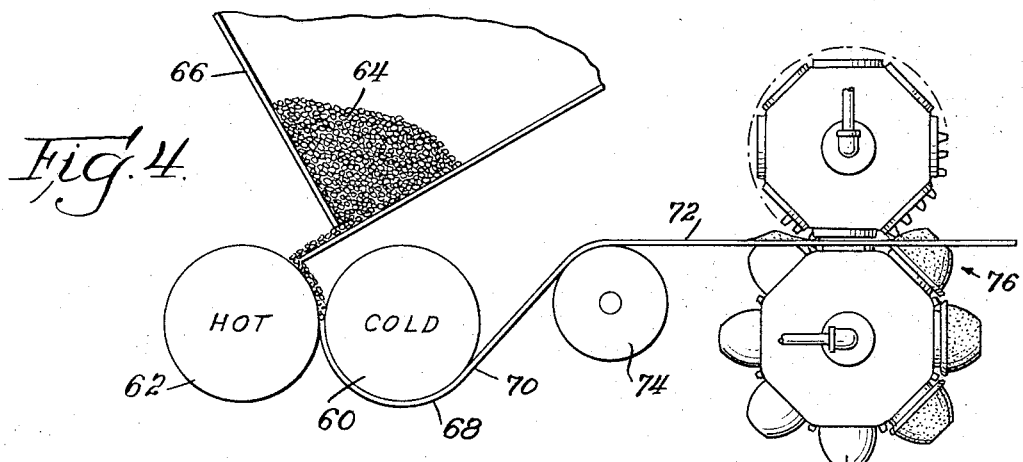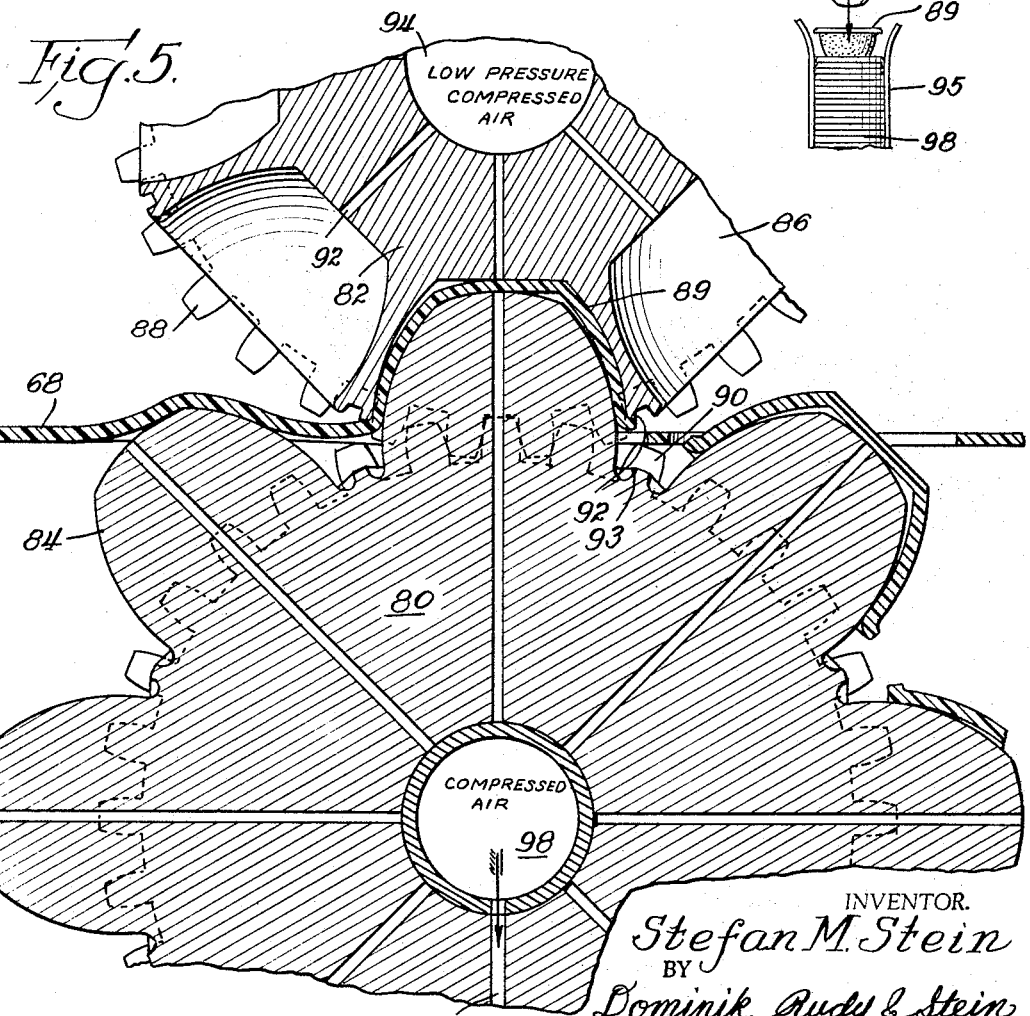

3,329,306
INSULATED CONTAINER
Stefan M. Stein, 555 Stratford St., Chicago, Ill.
Filed Dec. 16, 1963, Ser. No. 330,798
1 Claim. (Cl. 220—83)

This invention relates to an insulated container and to means for forming said container. More particularly, this invention relates to a novel foamed plastic container and to a method and means for forming said container from partially expanded sheet.

Disposable containers have become very popular for dispensing hot or cold drinks. Such containers are usually made of paper, plastic, or even molded expandable plastic.

Paper containers are generally formed by rolling heavy gauge paper into a cylinder, or a frusto cone, and then adhering the abutting ends. A bottom is then placed on the tubular shape.

Plastic containers are usually vacuum formed with or without positive assist to make them economically competitive with paper containers. Such forming is illustrated in U.S. 2,891,280 and U.S. 2,962,758. The plastic used generally comprises polystyrene, polyethylene, ethylcellulose or the like.

Although the switch to plastic cups is an advance, problems still exist with respect to use of the container. The avoidance of a cardboard taste is offset by loss of insulation. Also, plastic cups have less strength and usually crack in a vertical direction with severe use. To overcome the undesirable "hot touch" of plastic cups, the trade has resorted to different sidewall configurations, such as illustrated in U.S. 2,905,350. But the problem of heat transfer still persists.

With the advent of a foam plastic, the trade has begun to switch to molded cups wherein the wall and bottom are formed of foam plastic. U.S. 2,951,260 is a typical disclosure of such use. The cup shown has good insulation properties.

Unfortunately, the economics of molding such a cup do not compare with paper or formed plastic cups. The manufacture costs too much.

The use of sheets of foamed plastic for thermoforming cups has also been used, but unfortunately, with such thermoforming, the insulative features of the foamed sheet are lost. In addition, the open-cell structure of the foamed sheet persists in the thermoformed cup, and during use the cup acquires an unsightly stain when coffee is used therein. U.S. 2,942,301 is an instance of such thermoforming of foamed sheet.

An object of this invention is to provide a novel plastic container having an outer foam structure and an inner solid sheet structure.

Another object is to provide a container which insulates against loss of heat or cold of its contents.

Still another object is to provide a plastic container of low cost.

A further object is to provide a foamed plastic container which has an attractive outer surface.

A still further object is to provide a foamed plastic container which has an outer surface that promotes circulation of air between its outer structure and the fingertips of the user of said container.

Another object is to provide a novel method for forming said containers.

Another object is to provide novel apparatuses for forming said containers.

Another object is to provide a method and apparatus utilizing sheet directly from its forming process to make said containers.

Another object is to provide for continuous operation of said method and apparatus.

Another object is to provide a method and apparatus which lends itself both to small and large scale operation.

Other objects of the invention will in part be obvious and will in part appear hereinafter.

The invention accordingly comprises the several steps and the relation of one or more of such steps with respect to each of the others, the apparatus embodying features of construction, combination and arrangement of parts which are adapted to effect such steps, and the product which possesses the characteristics, properties and relation of elements, all as exemplified in the detailed disclosure hereinafter set forth, and the scope of the invention will be indicated in the claims.

FIG. 1 is a side pictorial view of one embodiment of apparatus useful for forming the container of this invention out of sheet material.

FIG. 2 is a sectional view, partly broken, of the mechanism illustrated in FIG. 1 taken along line 2—2 of FIG. 1.

FIG. 3 is a side view, partly in section, illustrating a cup which was formed using the apparatus of FIG. 1.

FIG. 4 is a side view, partly in section, of apparatus which combines sheet-forming and shallow-container forming.

FIG. 5 illustrates a detailed view of the container-forming portion of the apparatus of FIG. 4.

Similar references characters refer to similar parts throughout the several views of the drawings.

In accordance with such objects, it has now been found that insulated containers such as hot cups, plates, soup bowls, and the like may be "foam-formed" by utilizing sheet having a layer of expandable thermoplastic on one side and a layer of non-expandable or expanded thermoplastic on the other side fused together into a web. Such foam-forming is preferably accomplished immediately after the web is formed so that the heat of web formation is utilized in the foam-forming of the container.

More particularly, it has now been found that sheet, formed of a layer of expandable thermoplastic particles, preferably beads, which are fused on one side into a web, may be passed between forming rolls or conveyors to form it into desired containers and at the same time foam the expandable side of said sheet to produce unique insulated containers. These containers will have a smooth impervious stain-resistant inner surface and an outer surface which has an attractive pebbled appearance. In addition, the container so formed has an insulated wall and bottom structure whereby the contents will be insulated from the atmosphere. Such containers are especially useful as coffee cups, soup bowls, ice cream containers and the like. The "slip" of the outer and inner wall surfaces permits the use of the cup in automatic vending apparatus, and by proper angling of the sidewall, stacking is possible.

The invention is now described in detail by reference to the apparatus shown in the accompanying drawings.

Cup forming

In FIG. 1, there is shown a sheet 10, which has an upper surface 10U of fused or imperforate web structure and a lower surface 10L of discrete particles of expandable polymeric plastic. The sheet travels from right to left between two conveyors 12 and 14. The upper conveyor 12 supports a series of male forming elements 16 which push or depress into sheet 10 to form it into cups as described more fully below. The lower conveyor 14, on the other hand, contains a series of female mold elements 18 which match the inner surface of the outer surface of the male elements 16 so that when mated, they form a cup in the clearance between them (see FIG. 2).

It is also possible to provide for fluted, convolute, helical, or other surfaces on one or both elements if desired. It is desirable to provide means to heat both mold elements whereby the unexpanded layer of sheet 10 during cup formation is further expanded. Such means may be external or internal of said mold elements.

As seen, both the male and female elements 16 and 18, respectively, and the conveyors 12 and 14, travel in a continuous elliptical path. Sprockets 20 and 22 support the male element conveyor 12 and sprockets 24 and 26 support the female element conveyor 14. One sprocket of each conveyor is powered and synchronized with the powered sprocket of the other conveyor so that both conveyors operate at the same speed.

As seen in FIG. 2, each male mold element is affixed upon a support plate 30 which in turn is mounted upon rod 28, described below. Preferably, a series of male elements 16, 16a, etc. are lined in row fashion upon the plate 30 so that a transverse array (vertical to the plane view of FIG. 1) is formed. Thus, FIG. 1 merely illustrates the end view of the conveyors 12 and 14, and the sprockets 20, 22, 24, and 26, and each row of male elements 16. Each conveyor may comprise a relatively wide belt, preferably metal, mounted upon sprockets of drum shape, or else two or more spaced sprocket chains each mounted upon sprockets with conveyor connectors 33 and 42 bolted between them to laterally join the two or more chains of each conveyor. Bolt 35 joins the connector 33 to chain 12. A relatively wide sheet 10 can therefore be used with the apparatus of FIG. 1 to form a plurality of cups on each pass.

Each support rod 28 is reciprocably mounted within an appropriately sized bearing hole 32 in a conveyor connector 33. In addition, the rod is encircled by a cam spring 34.

The top of the rod has a cam follower 36 which engages and is actuated by cam 38 (see FIG. 1) as the conveyor 12 travels in an elliptical path. It will be noted from FIG. 1, that the cam 38 has a half tear drop shape so that the cam follower will go from an up to a down position, as the male element 16 travels between the conveyors 12 and 14. Thus, the male is depressed, forced or punched into sheet 10 as it travels from right to left between conveyors 12 and 14 (see FIG. 1).

Such punch movement of the male element 16 is backed by a female mold element 18 which, as seen in FIG. 2, supports and shapes the outside of cup 40 during its formation. In the preferred embodiment, the female mold element 18 is contained within or integral with connector 42 along with other female elements transversely positioned with respect to the plane of FIG. 1. Plate 42 has an equal number of female mold elements 18, 18a, etc. as that of support plate 30 and its male forming elements 16, 16a, etc. Connector 42 is secured at its one end to conveyor 14 via bolt 44. Rail 45 provides support to the connector.

When the male forming element and the female mold element 18 are in mating position, a clearance or cavity is effected which permits further expansion of the expandable plastic. The finished insulated cup 40 will therefore have a side wall and a bottom of substantial thickness which acts to both support and insulate the hot or cold contents within the container from the atmosphere and the fingers of the user during use.

At the terminal portion of the punch movement, the lip of rim 46 of each male forming element 16 acts as a knife edge to sever each formed cup 40 from sheet 10. After formation and severance of the cup from sheet 10, and upon release of cam follower 36 by cam 38, the male forming element 16 retracts by the action of cam spring 34.

The formed cup, at this stage, remains within the cavity of the female mold element 18. Conveyor 14 transports the female mold element 18 with the formed cup therein around sprocket 24. As soon as it makes a 180° turn, the release pin 48 reciprocally mounted within the base of female mold element 18, contacts the ejection cam 50. This causes the release pin 48 to be depressed into the cavity of the female mold element 18 against the force of release pin spring 52 (see FIG. 2). Such depression causes ejection of the formed cup 40 out of the female mold element cavity. An appropriately designed receiving apparatus gathers the ejected cup and automatically stacks it upon other cups previously ejected.

The emptly female mold element 18 then travels around sprocket 26 back to the cup forming station between the conveyors and another cup forming process is automatically repeated.

With respect to cup 40 that is formed, it will be noted from FIG. 3 that the inside surface 54 of the cup has a smooth, impermeable structure while the outside surface 56 has a foamed, beaded structure. The latter is very attractive and uniquely provides a plurality of air spaces. These spaces and the insulation quality of the foamed plastic insulates the user of the cup from any heated substance within the cup. The smooth inner structure provides a friction-free surface whereby a stacked array of cups 40 may be automatically dispensed by automatic vending machine equipment. Furthermore, there will be no unsightly staining of the interior of the cup because of the impermeable nature of the inner surface 54.

*Shallow container forming*

FIGS. 4 and 5 show another embodiment of apparatus wherein a combined sheet forming and container forming technique is involved. Such a combination is desirable because it permits use of the heat of formation of the sheet in the container forming operation. Also, the heat provides for continued expansion of the beaded expandable thermoplastic. By supplementing such heat with additional heat, either ambient or else by heat coils within the apparatus, the plastic of the formed container will be completely expanded.

Although several different sheet forming methods may be utilized, the one preferred is that wherein the sheet is formed by the momentary application of fusing heat to one side of spread layer of the expandable plastic substance. This method is described in detail in copending application Ser. No. 203,238 filed June 18, 1962, now Patent No. 3,285,795.

As shown in FIG. 4, the apparatus consists of a cold press roll 60 and a hot casting roll 62 mounted in a horizontal tandem relationship. Expandable plastic 64, contained within hopper 66, is fed in a flat spread form onto the hot roll 62. The heat of the hot casting roll 62 is such that almost instantaneous fusing of one side of the particulate material occurs, and a sheet 68 is formed. The sheet is pressed via cold press roll 60.

The formed sheet has a lower fused structure and an upper beaded structure 72. The beaded structure comprises the unfused portion of the plastic particles. These are still subject to further expansion by the application of heat.

After formation, sheet 68 travels over guide roll 74 and then through the container forming apparatus, broadly illustrated by 76 and described in detail below.

As seen in detail in FIG. 5, the container forming apparatus comprises two intermeshing rolls 80 and 82, mounted in vertical tandem relationship. The lower roll 80 has a series of male forming elements 84 while the upper roll 82 has a series of female mold depressions 86 on its periphery which intermesh with the male forming elements 84 as both rolls 80 and 82 rotate. To insure accurate intermeshing, rolls 80 and 82 contain gear teeth 88 and 90, respectively, which intermesh. Circumferential rows of the teeth are located between the circumferential rows of male and female elements 84 and 86 on the surface of rolls 80 and 82, respectively.

At this point, it should be realized that FIG. 5 merely illustrates a cross-section of one circumferential row of male and female elements. Actually, each roll 80 and 82 has considerable depth, transverse to the plane of the cross-sectional view so that a number of circumferential rows of male and female elements may be spaced on the rolls parallel to the row shown. A relatively wide sheet 68 may, therefore, be passed between the rolls so that a series of containers 89 may be formed with each pass.

As sheet 68 travels between rolls 80 and 82, it is still pliable by reason of its heat of formation. The male forming element 84 stretches a portion of the sheet into an opposing female mold element 86. Accompanying such stretch movement of sheet 68 is the application of vacuum, via passageway 92, communicating with a low pressure air manifold 94 in the center of roll 82. A vacuum forming with a positive assist technique is thereby effected to produce container 89.

Simultaneous with the formation of the container 89, the upper roll 82 severs the formed container from the sheet. This is accomplished by the action of a circular knife 92 against edge 93.

The formed and severed container 89 is retained by the male forming element 84, until it is positioned above stacking tube 95 (see FIG. 4), at which time, compressed air via passageway 96 from compressed air manifold 98 in the center of roll 80 blows the formed container downwardly. Eventually, a stack of containers 89 is effected within stacking tube 95.

As in the prior embodiment, each formed container 89 has an attractive outer beaded surface and a smooth impervious inner surface. The smooth impervious inner surface resists staining, while the outer beaded surface provides insulative characteristics to the container. Stacks of such individual containers may be dispensed by automatic vending apparatus.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed as new and desired to be secured by Letters Patent is:

An insulated cup-shaped plastic container having a wall formed solely of foamed plastic pellets, said foamed pellets being fused into a single unitary wall, the inner face of said wall being fused sufficiently to provide a smooth continuous liquid impervious surface and the outer face of said wall being fused only sufficiently to bond said pellets together for structural strength while leaving a pebbly outer surface to enhance the insulating value of said wall.

References Cited
UNITED STATES PATENTS

| | | | |
|---|---|---|---|
| 2,737,503 | 3/1956 | Sprague et al. | |
| 2,950,505 | 8/1960 | Frank. | |
| 2,962,407 | 11/1960 | Aykanian | 264—53 |
| 3,013,306 | 12/1961 | Richie et al. | |
| 3,037,652 | 6/1962 | Wallace. | |
| 3,042,972 | 7/1962 | Lafferty | 264—53 |
| 3,128,029 | 4/1964 | Price et al. | |
| 3,141,595 | 7/1964 | Edwards. | |
| 3,159,698 | 12/1964 | Suh et al. | |
| 3,162,705 | 12/1964 | Smucker et al. | 264—53 |

THERON E. CONDON, *Primary Examiner.*

JAMES R. GARRETT, LOUIS G. MANCENE,
*Examiners.*